United States Patent
Courtright et al.

(10) Patent No.: US 9,840,289 B2
(45) Date of Patent: Dec. 12, 2017

(54) TRUCK BED SPACER

(71) Applicant: Ford Global Technologies, LLC, Dearborn, MI (US)

(72) Inventors: Mark Joseph Courtright, Allen Park, MI (US); Vincent Anthony Chimento, Plymouth, MI (US); Dragan B. Stojkovic, Taylor, MI (US); Jack Marchlewski, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 15/044,581

(22) Filed: Feb. 16, 2016

(65) Prior Publication Data

US 2017/0233016 A1    Aug. 17, 2017

(51) Int. Cl.
*B62D 33/00* (2006.01)
*B62D 33/077* (2006.01)
*B62D 29/00* (2006.01)

(52) U.S. Cl.
CPC ......... *B62D 33/077* (2013.01); *B62D 29/007* (2013.01); *B62D 29/008* (2013.01)

(58) Field of Classification Search
CPC ... B62D 33/077; B62D 29/007; B62D 29/008
USPC .............................................. 296/35.3, 183.1
See application file for complete search history.

(56) References Cited

U.S. PATENT DOCUMENTS

| | | | |
|---|---|---|---|
| 4,817,264 A | 4/1989 | Worthing | |
| 6,659,702 B2 | 12/2003 | Kitayama et al. | |
| 7,370,878 B2 | 5/2008 | Nakazawa | |
| 8,840,350 B2 | 9/2014 | Inaba et al. | |
| 2004/0083669 A1 | 5/2004 | Hilburn | |
| 2005/0057060 A1* | 3/2005 | Edwards | B60P 7/0807 296/35.3 |
| 2011/0256418 A1 | 10/2011 | McGowan et al. | |
| 2015/0375802 A1* | 12/2015 | Courtright | B62D 25/2027 296/183.1 |

FOREIGN PATENT DOCUMENTS

| | | |
|---|---|---|
| CN | 202431725 U | 9/2012 |
| EP | 1300596 A1 | 4/2003 |

* cited by examiner

*Primary Examiner* — Joseph D Pape
(74) *Attorney, Agent, or Firm* — Jason Rogers; Brooks Kushman P.C.

(57) ABSTRACT

A crush-tube assembly for securing a truck bed to a frame of a vehicle. The crush-tube assembly includes a first hole defined by the truck bed, a crush-tube defining an inner diameter, a cross-member defining a second hole, and a frame defining a third hole. A bolt extends through the first hole, the crush-tube, the second hole, and third hole. The inner diameter is smaller than the second hole and maintains pressure around a periphery of the second hole. The pressure applied by the bolt around the hole in the cross-member prevents abrasion of the e-coat previously applied to the cross-member and thereby reduces the potential for corrosion of the cross-member.

7 Claims, 2 Drawing Sheets ized and functional details in various and alternative forms.

TRUCK BED SPACER

TECHNICAL FIELD

This disclosure relates to aluminum spacers used to mount a pick-up truck bed to a steel frame.

BACKGROUND

In an effort to reduce the weight of vehicles and improve fuel efficiency of vehicles, aluminum body parts are being incorporated into vehicles. The truck bed of a pick-up truck is a large body part that can result in significant weight savings if it is made of aluminum instead of steel. The truck bed may be mounted on a steel frame provided to assure the strength and durability of the vehicle. The combination of aluminum parts and steel parts in an assembly may cause galvanic corrosion.

As shown in prior art FIGS. 1 and 2, a pick-up truck bed 10 may be secured with bolts 12 to the frame 14. The bolts 12 are inserted into truck bed mounting holes 16 defined by the truck bed 10. A crush-tube 20 and crush-tube reinforcement washer 22 receive the bolt 12 between the truck bed 10 and the cross-member 18. A reinforcement hole 24 is defined by the crush-tube reinforcement washer 22. The cross-member 18 may include a seal 26 within a mounting hole 28 formed in the cross-member 18 that receives the bolt 12. A J-nut 29 may be used to retain the attaching nut 30 that secures the bolt 12 to the assembly.

Accelerated galvanic corrosion may occur at the edge of the mounting hole 28 defined by the cross-member 18 and a frame mounting hole 32 defined by the steel frame 14. The inner diameter of the crush-tube 20 is larger than the mounting hole 28 in the cross-member 18. The crush-tube 20 does not maintain sufficient contact around the edge of the mounting hole 28 in the cross-member 18. Abrasion of the anti-corrosion e-coat on the cross-member 18 may lead to corrosion initiating at the mounting hole 24 that may propagate under the crush-tube 20. Abrasion of the components used to mount the truck bed 10 on the frame 14 can cause gage loss and clamp load loss in the bolted connection over time.

This disclosure is directed to solving the above problem and other problems as summarized below.

SUMMARY

According to one aspect of this disclosure, an assembly is disclosed for securing a truck bed to a frame of a vehicle. The assembly comprises the truck bed defining a first hole, a crush-tube defining an inner diameter, a cross-member defining a second hole, and a frame defining a third hole. A bolt extends through the first hole, the crush-tube, the second hole and third hole. The inner diameter of the crush-tube is smaller than the second hole to maintain contact around a periphery of the second hole.

According to other aspects of this disclosure, the diameter of the third hole may be less than the diameter of the second hole to maintain contact between the cross-member and the frame. The diameter of the third hole may be equal to the inner diameter of the crush-tube to maintain contact between the cross-member and the frame. The second hole may be larger than the inner diameter of the crush-tube and the diameter of the third hole.

Another aspect of this disclosure relates to a truck bed assembly comprising a truck bed defining a first plurality of mounting holes, a plurality of crush-tubes that each defines an inner opening having a first diameter, and a cross-member defining a second plurality of mounting holes. The second plurality of mounting holes has a second diameter that is larger than the first diameter. The frame defines a third plurality of mounting holes. A plurality of bolts are each inserted through one of the first plurality of mounting holes, the inner openings, the second plurality of mounting holes, and the third plurality of mounting holes. A nut is received by each of the bolts and engages the frame to secure the truck bed to the frame.

According to other aspects of this disclosure relating to the truck bed assembly, a third diameter of the third plurality of mounting holes may be less than the second diameter of the second plurality of mounting holes to maintain contact between the cross-member and the frame. The third diameter of the third plurality of mounting holes may be equal to the first diameter to maintain contact between the cross-member and the frame. The second diameter may be larger than the first diameter and the third diameter.

Another aspect of this disclosure relates to a vehicle that comprises an aluminum truck bed attached to a steel frame. A crush-tube and a cross-member are inserted between the truck bed and frame. The crush-tube defines an inner opening having a first diameter and the cross-member defines a mounting hole having a second diameter. The first diameter is smaller than the second diameter so that the crush-tube engages and overhangs a periphery of the mounting hole. A bolt secures the truck bed to the frame with a nut and the bolt that extends through the inner opening and the mounting hole defined by the crush-tube to clamp the crush-tube against the cross-member.

According to other aspects of this disclosure relating to the vehicle embodiment, the frame may define a frame mounting hole having a diameter less than the diameter of the mounting hole defined by the cross-member so that the bolt clamps the cross-member to the frame. The diameter of the frame mounting hole may be equal to the first diameter of the inner opening defined by the crush-tube. The second diameter of the mounting hole in the cross-member may be larger than the first diameter of the inner opening and the frame mounting hole.

The above aspects of this disclosure and other aspects are described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
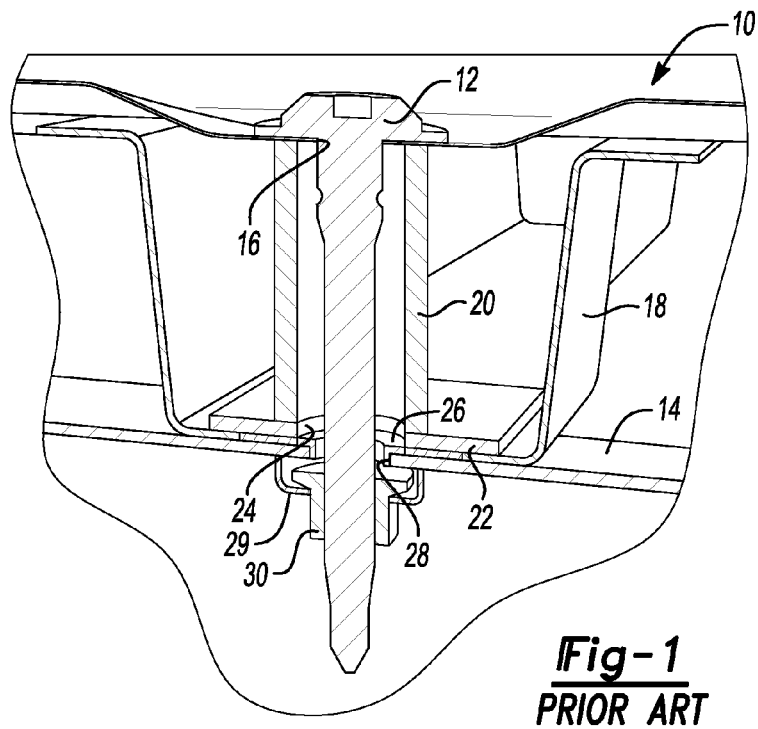
FIG. 1 is a fragmentary perspective view partially in cross-section of a prior art truck bed crush-tube assembly.
Figure 2:
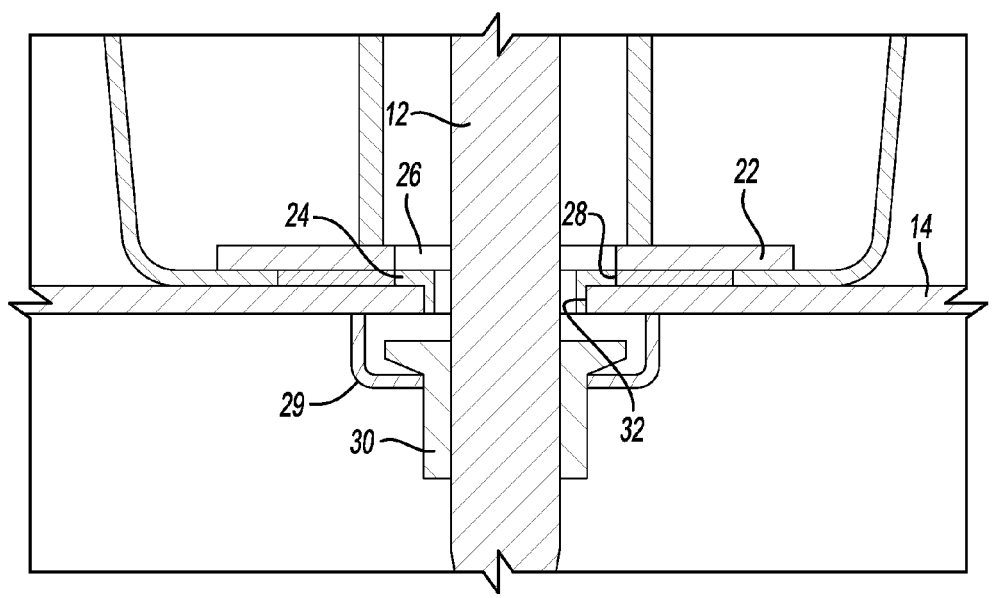
FIG. 2 is a fragmentary cross-section view of the prior art truck bed crush-tube assembly shown in FIG. 1.
Figure 3:
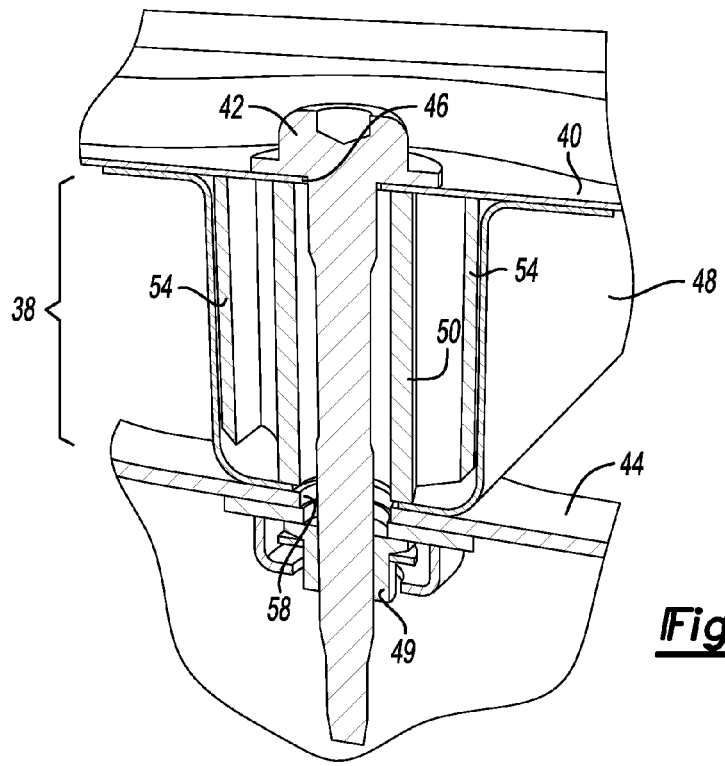
FIG. 3 is a fragmentary perspective view partially in cross-section of a truck bed crush-tube assembly made according to one embodiment of this disclosure.
Figure 4:
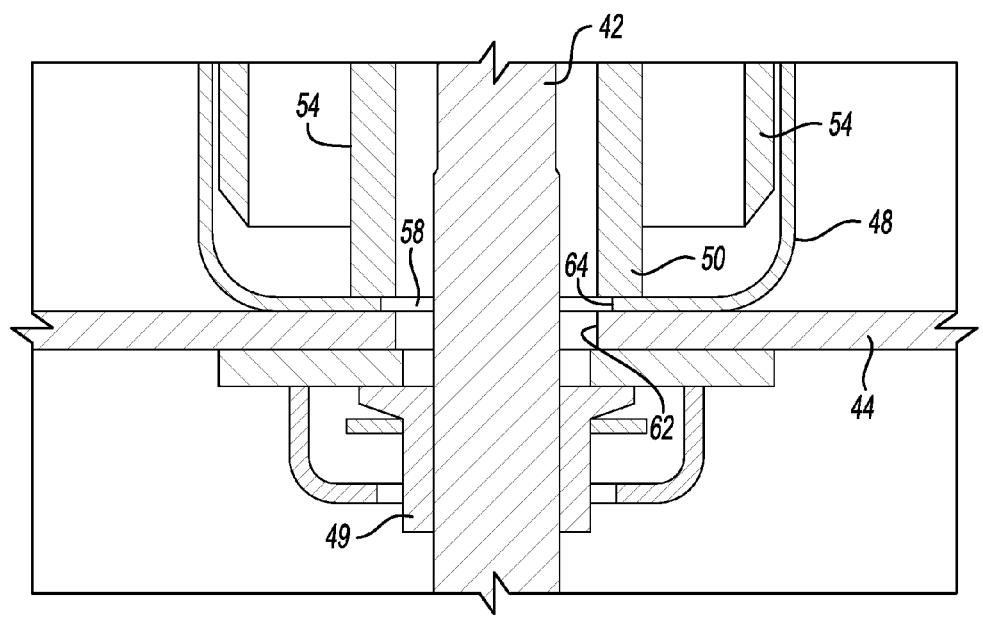
FIG. 4 is a fragmentary cross-section view of the truck bed crush-tube assembly shown in FIG. 3.

Referring to FIGS. 3 and 4, a truck bed crush-tube assembly 38 is illustrated that is made according to one embodiment of this disclosure. The truck bed crush-tube assembly 38 is shown attached to a pick-up truck bed 40. A plurality of bolts 42 are used to secure the pick-up truck bed 40 to a frame 44. Mounting holes 46 are provided in the truck bed 40 through which the bolts 42 are inserted. A cross-member 48 extends transversely across the truck bed to reinforce the pick-up truck bed 40.

A crush-tube 50 is assembled between the truck bed 40 and the cross-member 48 that reinforces the truck bed 40 and prevents distortion of the surface of the truck bed 40. An extruded aluminum spacer 54 may be part of or assembled to the crush-tube 50 and assembled within the cross-member 48. The frame 44 defines a mounting hole 62 through which the bolt 12 is inserted through the frame 44. Mounting hole 58 is provided in the cross-member 48. A recess 64 is defined between the crush-tube 50, the mounting hole 58 in the cross-member 48, and the frame mounting hole 62 provided in the frame 44.

In the disclosed embodiment, the crush-tube 50 has a smaller inner diameter than the diameter of the mounting hole 58 in the cross-member 48. When the bolt 42 and attaching nut 49 are tightened, the crush-tube 50 bears upon the cross-member 48 around the mounting hole 58. Pressure applied around the periphery of the mounting hole 58 reduces movement of the cross-member 48 and reduces abrasion of the anti-corrosion E-coat previously applied to the cross-member 48. Applying pressure around the periphery of the mounting hole 58 in the cross-member 48 reduces galvanic corrosion initiating at the edge of the pick-up box mounting holes 58 in the cross-member 48.

As best shown in FIG. 4, the mounting hole 62 defined by the frame 44 has a smaller diameter than the mounting hole 58 defined by the cross-member 48. The recess 64 is part of the mounting hole 58 defined by the cross-member 48. The recess 64 is located between the crush-tube 50 and the frame 44. The mounting hole 62 in the frame 44 is smaller than the mounting hole 58 in the cross-member 48 to exert a compressive force against the cross-member to reduce abrasion on the lower side of the cross-member 48 and the possibility of corrosion developing.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. An assembly comprising:
   a truck bed defining a first hole;
   a crush-tube defining an inner diameter;
   a cross-member defining a second hole;
   a frame defining a third hole having a diameter equaling the inner diameter to maintain contact between the cross-member and the frame; and
   a bolt extending through the first hole, crush-tube, second hole and third hole, the inner diameter being smaller than the second hole to maintain contact around the second hole.

2. The assembly of claim 1 wherein a diameter of the third hole is less than a diameter of the second hole to maintain contact between the cross-member and the frame.

3. The assembly of claim 1 wherein the second hole is larger than the inner diameter and a diameter of the third hole.

4. A truck bed assembly comprising:
   a truck bed defining a first plurality of mounting holes;
   a plurality of crush-tubes that each define an inner opening having a first diameter;
   a cross-member defining a second plurality of mounting holes, wherein the second plurality of mounting holes have a second diameter that is larger than the first diameter;
   a frame defining a third plurality of mounting holes;
   a plurality of bolts each inserted through one of the first plurality of mounting holes, the inner openings, the second plurality of mounting holes, and the third plurality of mounting holes, wherein a third diameter of the third plurality of mounting holes is less than the second diameter of the second plurality of mounting holes to maintain contact between the cross-member and the frame, and wherein the third diameter of the third plurality of mounting holes is equal to the first diameter to maintain contact between the cross-member and the frame; and
   a plurality of nuts each received by one of the bolts, wherein the nuts engage the frame to secure the truck bed to the frame.

5. The truck bed assembly of claim 4 wherein the second diameter is larger than the first diameter and the third diameter.

6. A vehicle comprising:
   an aluminum truck bed attached to a steel frame;
   a crush-tube and a cross-member inserted between the truck bed and frame, wherein the crush-tube defines an inner opening having a first diameter and the cross-member defines a mounting hole having a second diameter, wherein the first diameter is smaller than the second diameter, and wherein the crush-tube engages and over hangs a periphery of the mounting hole; and
   a bolt securing the truck bed to the frame with a nut wherein the bolt extends through the inner opening and the mounting hole defined by the cross-member to clamp the crush-tube against the cross-member, wherein the frame defines a frame mounting hole having a diameter less than the diameter of the mounting hole defined by the cross-member, and wherein the bolt clamps the cross-member to the frame, and wherein the diameter of the frame mounting hole is equal to the first diameter of the inner opening defined by the crush-tube.

7. The vehicle of claim 6 wherein the second diameter of the mounting hole in the cross-member is larger than the first diameter of the inner opening and the frame mounting hole.

* * * * *